United States Patent
Ito

(10) Patent No.: US 9,234,443 B2
(45) Date of Patent: Jan. 12, 2016

(54) ENGINE STRUCTURE WITH LUBRICATING OIL RESERVOIR

(75) Inventor: Takao Ito, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/702,870

(22) PCT Filed: May 17, 2011

(86) PCT No.: PCT/IB2011/001062
§ 371 (c)(1),
(2), (4) Date: Dec. 7, 2012

(87) PCT Pub. No.: WO2011/158075
PCT Pub. Date: Dec. 22, 2011

(65) Prior Publication Data
US 2013/0081590 A1 Apr. 4, 2013

(30) Foreign Application Priority Data
Jun. 15, 2010 (JP) .................. 2010-135888

(51) Int. Cl.
*F01M 9/00* (2006.01)
*F01M 5/02* (2006.01)
(Continued)

(52) U.S. Cl.
CPC ................ *F01M 9/00* (2013.01); *F01M 5/025* (2013.01); *F01M 11/02* (2013.01); *F16N 7/02* (2013.01); *F01M 2011/0095* (2013.01); *F01M 2011/026* (2013.01)

(58) Field of Classification Search
CPC ............ F01M 9/00; F01M 9/06; F01M 9/08; F01M 9/12; F01M 11/02; F01M 5/025; F01M 2011/0095; F01M 2011/026; F01M 2001/062; F01M 2011/0066; F16N 7/02; F16N 7/04
USPC ............................. 123/196 R; 184/6.5, 18, 65
See application file for complete search history.

(56) References Cited

U.S. PATENT DOCUMENTS 5,809,963 A * 9/1998 Saito .......................... 123/195 C
5,901,679 A * 5/1999 Tanaka et al. .............. 123/195 C
(Continued)

FOREIGN PATENT DOCUMENTS

DE 938761 2/1956
FR 618367 3/1927
(Continued)

OTHER PUBLICATIONS

An English translation of the Japanese Office Action for the corresponding Japanese patent application No. 2010-135888 issued on Feb. 4, 2014.
(Continued)

*Primary Examiner* — Lindsay Low
*Assistant Examiner* — Grant Moubry
(74) *Attorney, Agent, or Firm* — Global IP Counselors, LLP

(57) ABSTRACT

An engine structure is provided that basically includes a cylinder block, an oil circulation pathway and a lubricating oil reservoir. The cylinder block has an upper end for receiving a cylinder head, a lower end for receiving an oil pan, and a crankshaft receiving portion. The oil circulation pathway is arranged to convey lubricating oil by gravity to at least an area located above the crankshaft receiving portion of the cylinder block for supplying lubricating oil to a crankshaft. The lubricating oil reservoir is arranged to store lubricating oil. The lubricating oil reservoir has an open top end for receiving downwardly flowing lubricating oil. The open top end of the lubricating oil reservoir is arranged relative to the oil circulation pathway such that lubricating oil spilling out of the open top end of the lubricating oil reservoir falls into the oil circulation pathway.

7 Claims, 4 Drawing Sheets

(51) Int. Cl.
*F01M 11/02* (2006.01)
*F16N 7/02* (2006.01)
*F01M 11/00* (2006.01)

(56) References Cited

U.S. PATENT DOCUMENTS

| | | | |
|---|---|---|---|
| 5,954,159 A * | 9/1999 | Nakamura | 184/11.2 |
| 6,276,327 B1 * | 8/2001 | Fukuoka et al. | 123/196 W |
| 6,443,136 B1 * | 9/2002 | Suganami et al. | 123/572 |
| 6,725,850 B2 * | 4/2004 | Kurasawa et al. | 123/572 |
| 6,871,627 B2 * | 3/2005 | Fujikubo | 123/196 R |
| 7,886,711 B2 * | 2/2011 | Iwata et al. | 123/196 R |
| 8,393,306 B2 * | 3/2013 | Schiffer et al. | 123/41.86 |
| 2002/0170524 A1 * | 11/2002 | Lawrence | 123/196 R |
| 2008/0071437 A1 | 3/2008 | Hirata et al. | |
| 2009/0277416 A1 * | 11/2009 | Saito | 123/196 AB |

FOREIGN PATENT DOCUMENTS

| | | |
|---|---|---|
| JP | 49012336 | 2/1974 |
| JP | 62107201 A * | 5/1987 |
| JP | 64-34437 U | 3/1989 |
| JP | 2000-199420 A | 7/2000 |
| JP | 2005090362 | 4/2005 |
| JP | 2008038840 | 2/2008 |
| JP | 2009-13951 A | 1/2009 |
| JP | 2009-167984 A | 7/2009 |
| JP | 2010019196 | 1/2010 |
| WO | 2009/155997 A1 | 12/2009 |

OTHER PUBLICATIONS

An English translation of the Chinese Office Action for the corresponding Chinese patent application No. 201180026556.2 issued on Jun. 27, 2014.

The Chinese Office Action for the corresponding Chinese Application No. 201180026556.2 issued on Feb. 25, 2015.

* cited by examiner

ENGINE STRUCTURE WITH LUBRICATING OIL RESERVOIR

CROSS-REFERENCE TO RELATED APPLICATIONS

This application is a U.S. National stage of International Application No. PCT/IB2011/001062, filed May 17, 2011. This application claims priority to Japanese Patent Application No. 2010-135888, filed on Jun. 15, 2010. The entire disclosure of Japanese Patent Application No. 2010-135888 is hereby incorporated herein by reference.

BACKGROUND

1. Field of the Invention

The present invention generally relates to an internal combustion engine. More specifically, the present invention relates to a structure of an internal combustion engine that aides in lubricating sliding portions of the engine.

2. Background Information

Engines have many moving parts that operate at high speeds. The sliding portions of these moving parts are subjected to friction and can therefore wear away. In view of this situation, lubricating oil is often supplied to the sliding portions by a pump driven by the engine. Some vehicles have an electric mode in which the engine itself stops and the vehicle is propelled by an electric motor alone. In such hybrid vehicles, the engine sometimes operates very infrequently. In particular, the engine may at times operate very infrequently in plug-in vehicles capable of being supplied with electrical power from an outside power source. In such hybrid vehicles, the pump stops when the vehicle is propelled by the motor alone, and lubricating oil cannot therefore be supplied to the sliding portions of the engine. In other words, lubricating oil could fail to drip down or provide lubrication when the engine has been stopped for a long time.

In the engine described in Japanese Laid-Open Patent Publication No. 2005-90362, lubricating oil in an auxiliary tank is supplied to an oil pan such the oil level in the oil pan is raised to a height that reaches the crankshaft bearings when the engine is stopped. In this way, the crankshaft bearings are lubricated when the vehicle is propelled by the motor alone. Thus, with this arrangement, excessive wear of the engine crankshaft bearings can be effectively prevented. The lubricating oil is then returned to the auxiliary tank during engine operation such that the lubricating oil level is thereby reduced so that the lubricating oil is not in contact with the crankshaft during engine operation.

SUMMARY

It has been discovered that in the aforementioned conventional device the manufacturing costs of the engine increase due to the need to add an auxiliary tank, an oil supply channel, an oil recovery pump, and the like in order to vary the height of the oil level within the oil pan.

One object presented in this disclosure is to provide an engine structure in which sufficient oil can be supplied even when the engine is stopped for a long time, without increasing the manufacturing costs.

In view of the state of the known technology, one aspect of this disclosure is to provide an engine structure that basically comprises a cylinder block, an oil circulation pathway and a lubricating oil reservoir. The cylinder block has an upper end for receiving a cylinder head, a lower end for receiving an oil pan, and a crankshaft receiving portion. The oil circulation pathway is arranged to convey lubricating oil by gravity to at least an area located above the crankshaft receiving portion of the cylinder block for supplying lubricating oil to a crankshaft. The lubricating oil reservoir is arranged to store lubricating oil. The lubricating oil reservoir has an open top end for receiving downwardly flowing lubricating oil. The open top end of the lubricating oil reservoir is arranged relative to the oil circulation pathway such that lubricating oil spilling out of the open top end of the lubricating oil reservoir falls into the oil circulation pathway.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
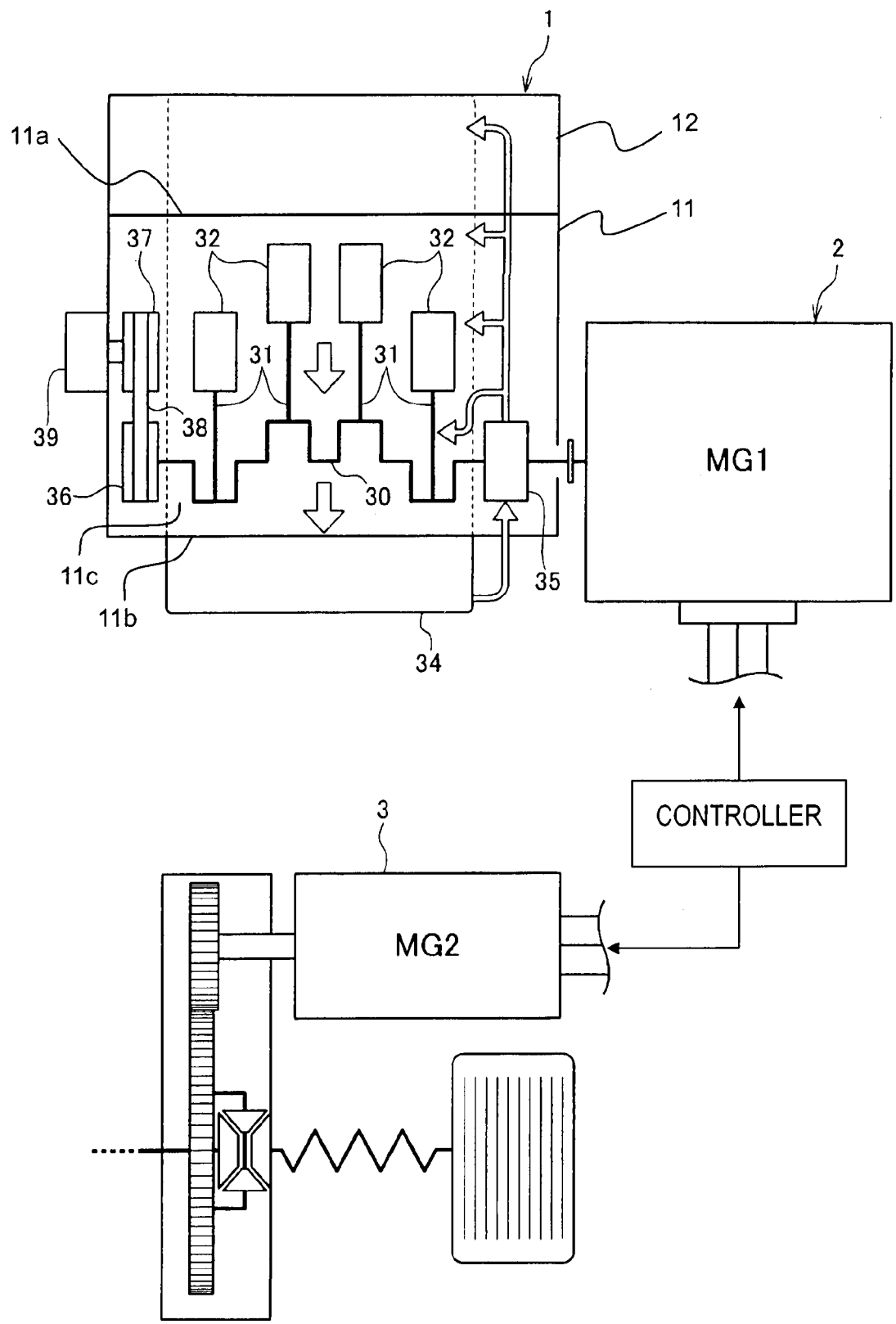
FIG. 1 is a simplified schematic view of a hybrid vehicle equipped with an engine structure in accordance with any one of the illustrated embodiments.

Referring initially to FIG. 1, a hybrid vehicle is schematically illustrated that is equipped with an engine structure in accordance with the illustrated embodiments. The hybrid vehicle basically includes an engine 1, an electric motor-generator 2 and a vehicle-driving propulsion motor 3. The engine 1 is configured to operate in an electric mode in which the engine itself stops and the vehicle is propelled by a motor alone. While the engine structure is installed in a hybrid vehicle that is propelled by the engine 1 and the propulsion motor 3, the application of the engine structure is not limited to this illustrated application. In the illustrated embodiment, the engine 1 is started by the motor-generator 2, which is a directly coupled to the engine 1. After ignition is completed, the motor-generator 2 is driven by the engine 1 to generate electricity or the like. The engine 1 stops when the drive from the engine 1 is no longer needed.

The motor-generator 2 is directly coupled to the engine 1 and used for providing both a motor function and a generator function. The motor function is a function in which the electric power of an electric battery is consumed to crank and drive the engine 1 when electricity generation is required with the engine stopped. The generator function is a function in which rotary drive power from the engine 1 is received to generate three-phase alternating-current (AC) electric power. The three-phase AC electric power generated by the motor-generator 2 is converted to direct-current (DC) electric power by a convertor, and is used to charge the electric battery. The motor-generator 2 is separate from the vehicle-driving propulsion motor 3. A controller is operatively coupled to the motor-generator 2 and the vehicle-driving propulsion motor 3 to control their operating modes in a conventional manner.

The engine 1 includes, among other things, a cylinder block 11, a cylinder head 12, a crankshaft 30, a plurality of connecting rods 31 and a plurality of pistons 32 in the cylinder block 11. The cylinder block 11 has an upper end 11a for receiving the cylinder head 12. Also an oil pan 34 is attached to a lower end 11b of the cylinder block 11. The cylinder block 11 also includes a crankshaft receiving portion 11c for rotatably supporting the crankshaft 30. In the illustrated embodiment, the cylinder block 11 has an upper block part and a lower block part with the crankshaft receiving portion 11c being formed at the interface between the upper and lower block parts. Thus, the cylinder block 11 is divided at the rotational axis of the crankshaft 30 to form the upper and lower block parts. An oil pump 35 is provided for pumping lubricating oil from the oil pan 34 to various areas of the engine 1 that require lubrication. The oil pump 35 is operatively attached to one end of the crankshaft 30 such that the oil pump 35 is driven by the rotation of the crankshaft 30. Typically, lubricating oil is pumped by the oil pump 35 from the oil pan 34 to the top portion and/or middle portions of the engine 1 such that supplied to the areas of the engine 1 that require lubrication. The lubricating oil is then returned by gravity to the oil pan 34 after passing through the areas that require lubrication. The lubricating oil flows in this way such that oil circulation pathways are formed, as shown by the white arrows in FIG. 1. The "areas requiring lubrication" include the camshaft bearings, the tappets, the pistons 32 and the crankshaft bearings.

The crankshaft 30 also has a pulley 36 operatively attached to the end that is opposite the oil pump 35. The pulley 36 is drives a pulley 37 via a belt 38 to operate a water pump 39. Thus, the water pump 39 is driven by the rotation of the crankshaft 30. Radiator coolant is pumped to cool the cylinder block and the like when the water pump 39 is rotatably driven by the crankshaft 30.

Figure 2:
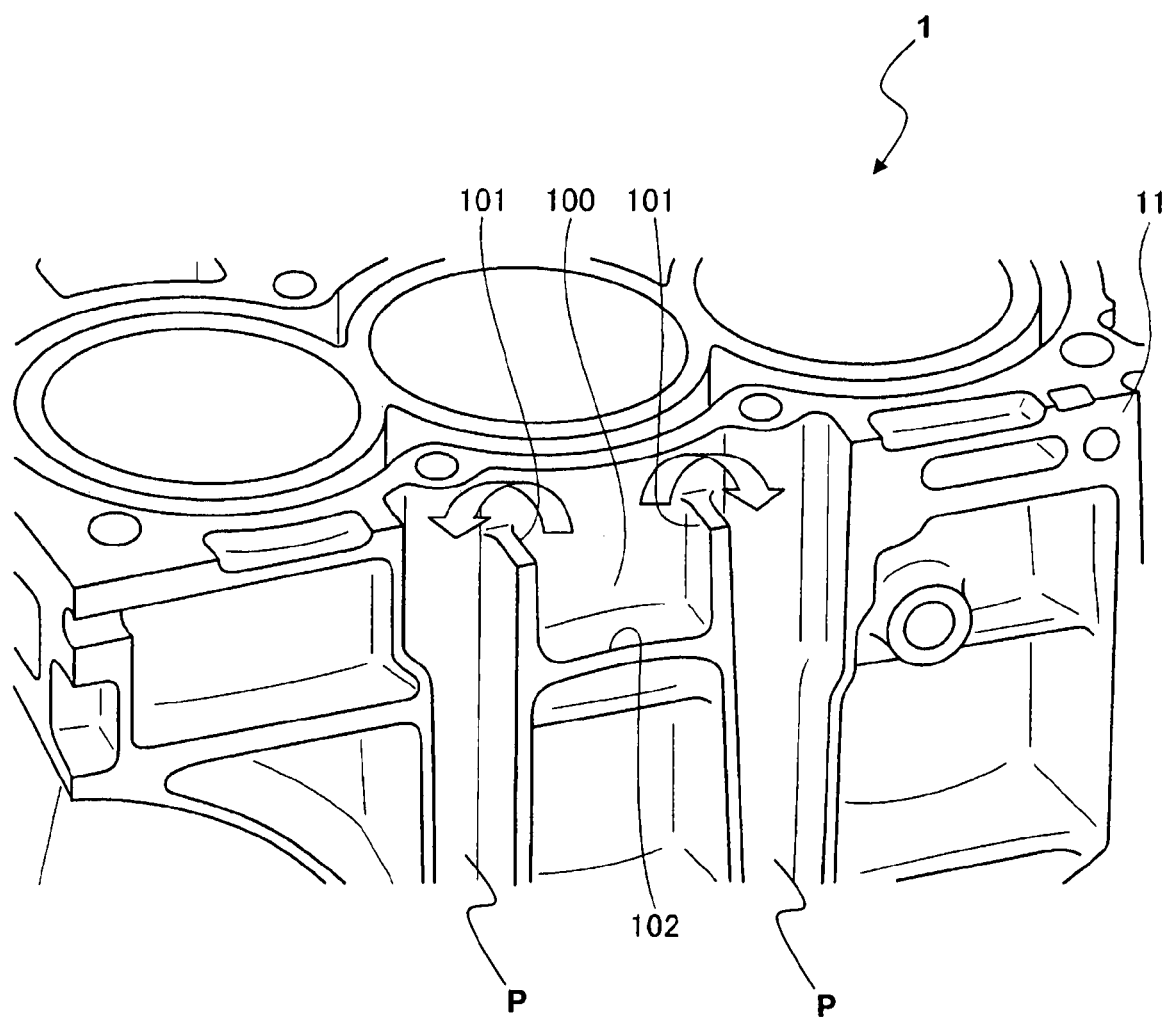
FIG. 2 is a partial perspective view of a cross section of the engine structure in accordance with a first embodiment.

FIG. 2 is a partial perspective view showing the engine structure in cross section in accordance with a first embodiment. The cylinder block 11 has a plurality of oil circulation pathways P and at least one oil reservoir 100. While only one oil reservoir 100 is shown in the cylinder block 11, additional oil reservoirs can be formed at other locations as needed and/or desired. The lubricating oil reservoir 100 is disposed above the crankshaft receiving portion 11c of the cylinder block 11. In particular, the lubricating oil reservoir 100 is provided above the rotation central axis of the crankshaft 30. The lubricating oil reservoir 100 is provided along one or more of the oil circulation pathways P. In the illustrated embodiment, the oil circulation pathways P and the lubricating oil reservoir 100 are both integrally formed (molded) with an upper block part of the cylinder block 12 as a one-piece member. Depending on the engine structure, the lubricating oil reservoir 100 can be a separate member if needed and/or desired.

The lubricating oil reservoir 100 is arranged to store lubricating oil that is pumped by the oil pump 35 from the oil pan 34 to the top portion and/or middle portions of the engine 1. In the illustrated embodiment, the lubricating oil reservoir 100 includes a pair of side walls 101 and a bottom 102. The lubricating oil reservoir 100 also includes a pair of walls extending between the side walls 101. Thus, the lubricating oil reservoir 100 is a recess with open at the top. Such a configuration allows the lubricating oil reservoir 100 to store lubricating oil flowing through the oil circulation pathways P.

The engine 1 sometimes operates infrequently in a vehicle having an electric mode in which the engine 1 itself stops and the vehicle is propelled by the driving propulsion motor 3 alone. Specifically, the engine 1 sometimes operates very infrequently in plug-in types capable of being supplied with electric power from an outside power source.

The oil pump 35 is driven by the engine 1, and the areas of the engine 1 that require lubrication can receive insufficient oil when the engine 1 is stopped and the driving propulsion motor 3 alone is used for propulsion. According to the first embodiment, the oil pump 35 is operated while the engine 1 is being driven, and lubricating oil is pumped from the oil pan 34 and supplied to the areas of the engine 1 that require lubrication. At this time, part of the lubricating oil is stored in the lubricating oil reservoir 100. The lubricating oil stored in the lubricating oil reservoir 100 surges over the side walls 101 and spills into the oil circulation pathway, as shown by the arrows in FIG. 2, as a result of vibrations caused by vehicle acceleration and deceleration, as well as vibrations from the road surface, while the engine 1 is stopped and the motor 3 alone is used for propulsion. Thus, the open top end of the lubricating oil reservoir 100 is arranged relative to the oil circulation pathways P such that oil spilling out of the open top end of the lubricating oil reservoir 100 falls into the oil circulation pathway P and flows to the crankshaft receiving portion 11c. In this way, the lubricating oil is supplied to the crankshaft bearings and other "areas requiring lubrication" for preventing the areas of the engine 1 that require lubrication from receiving insufficient oil. Thus, sufficient lubricating oil is therefore provided even when the engine 1 is stopped for a long time.

The first embodiment offers a simple structure in which the oil reservoir is provided along the oil circulation pathways P into which the lubricating oil falls. With such a structure, vibrations caused by vehicle acceleration and deceleration, as well as vibrations from the road surface, can be used when the engine 1 is stopped and the motor 3 alone is used for propulsion, and the lubricating oil remaining in the lubricating oil reservoir 100 can be dropped onto the sliding portions of the engine 1. Accordingly, lubrication can be performed even when the engine is stopped, and lubrication costs can be prevented from rising. In the present embodiment, the lubricating oil reservoir 100 is specifically provided above the rotation central axis of the crankshaft 30. In this way, the oil can be dropped onto the main metal of the crankshaft, which is an area particularly requiring lubrication, and lubrication costs can be prevented from rising.

Figure 3:
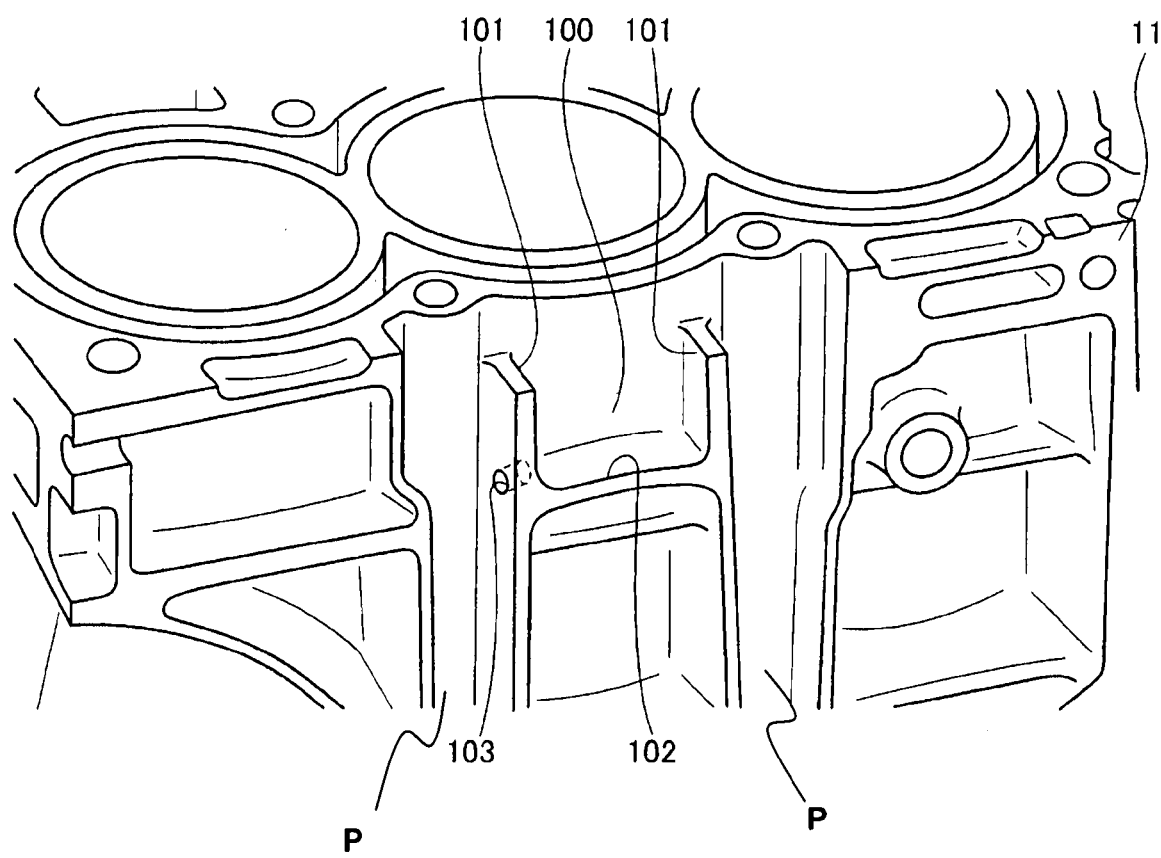
FIG. 3 is a partial perspective view of a cross section of the engine structure in accordance with a second embodiment.

Referring now to FIG. 3, a partial perspective view of an engine structure is illustrated in cross section in accordance with a second embodiment. The same symbols are applied below to portions having the same functions as those described above, and redundant descriptions are appropriately omitted for the sake of brevity.

In the second embodiment, an oil drain hole 103 is formed in the side wall 101 of the lubricating oil reservoir 100. Lubricating oil has a high viscosity, and is therefore difficult to drain if the oil drain hole 103 is small. The lubricating oil stored in the lubricating oil reservoir 100 is drained through the oil drain hole 103 into the oil circulation pathways P when there are vibrations caused by vehicle acceleration and deceleration, as well as vibrations from the road surface, during propulsion of the vehicle by the motor 3 alone. Accordingly, lubrication can be performed even when the engine 1 is stopped, and lubrication costs can be prevented from rising.

Although the lubricating oil level is lower than the oil drain hole 103 when the oil remaining in the lubricating oil reservoir 100 is at rest, the lubricating oil level rises and falls along the side walls 101 and vibrates greatly when there are vibrations caused by vehicle acceleration and deceleration, as well as vibrations from the road surface, during propulsion of the vehicle by the motor 3 alone. The lubricating oil level of the remaining lubricating oil rises above the oil drain hole 103 formed in the side wall 101 of the lubricating oil reservoir 100, and the lubricating oil is drained through the oil drain hole 103. Accordingly, lubrication can be performed even when the engine 1 is stopped, and lubrication costs can be prevented from rising. Very large vibrations occur when the natural frequency of the remaining oil corresponds to the frequency of the vibrations caused by vehicle acceleration and deceleration and the vibrations from the road surface. The size of the lubricating oil reservoir 100 and the position of the oil drain hole 103 are preferably set so as to keep the remaining oil at such a natural frequency.

Figure 4:
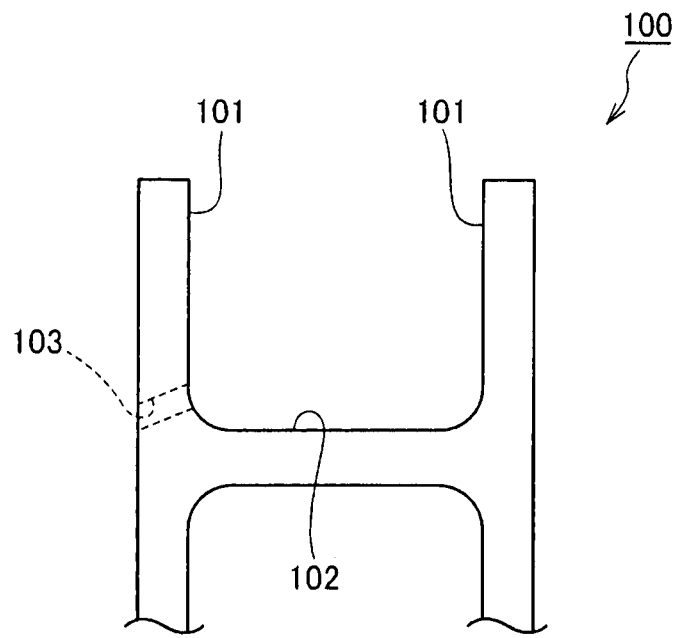
FIG. 4 is a partial front elevational view of a cross section of a part of the engine structure in accordance with a third embodiment.

Referring now to FIG. 4, a front elevational view of the lubricating oil reservoir 100 of the engine structure is illustrated in cross section to show an engine structure in accordance with a third embodiment. The same symbols are applied below to portions having the same functions as those described above, and redundant descriptions are appropriately omitted for the sake of brevity.

The oil drain hole 103 of the third embodiment is formed at a slant so as to be lower near the exterior. In other words, the oil drain hole 103 is angle downward such that an outlet opening of the oil drain hole 103 is lower than an inlet of the oil drain hole 103. Configuring the engine 1 in this way allows lubricating oil remaining in the lubricating oil reservoir 100 to be more easily drained through the oil drain hole 103. Accordingly, lubrication can be performed even when the engine 1 is stopped, and lubrication costs can be prevented from rising.

Figure 5:
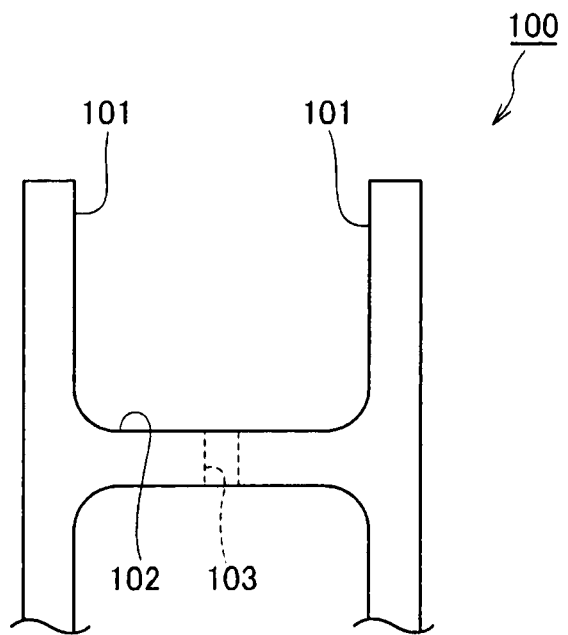
FIG. 5 is a partial front elevational view of a cross section of a part of the engine structure in accordance with a fourth embodiment.

Referring now to FIG. 5, a front elevational view of the lubricating oil reservoir 100 is illustrated in cross section to show an engine structure in accordance a fourth embodiment. The same symbols are applied below to portions having the same functions as those described above, and redundant descriptions are appropriately omitted for the sake of brevity.

The oil drain hole 103 of the fourth embodiment is formed in the bottom 102 of the lubricating oil reservoir 100. Lubricating oil has a high viscosity and is therefore difficult to drain if the oil drain hole 103 is small. The lubricating oil stored in the lubricating oil reservoir 100 is drained through the oil drain hole 103 into the oil circulation pathway when there are vibrations caused by vehicle acceleration and deceleration, as well as vibrations from the road surface, during propulsion of the vehicle by the motor 3 alone.

The lubricating oil reservoir 100 stores a comparatively large amount of lubricating oil. In some vehicles, therefore, increasing the depth of the lubricating oil reservoir 100 sometimes fails to force the lubricating oil to drop from the lubricating oil reservoir 100 solely by the acceleration of the vehicle due to the varying speed or vibration during propulsion. By contrast, the oil drain hole 103 in the fourth embodiment is formed in the bottom 102 of the lubricating oil reservoir 100, allowing the lubricating oil to be reliably dropped with a simple construction even in cases in which the lubricating oil reservoir 100 is deep, and lubrication costs to be prevented from rising.

The engine 1 is mounted on a vehicle having a mode in which the engine itself stops and the vehicle is propelled by a motor alone. An example of such a vehicle is a hybrid vehicle that is propelled by an engine and a propulsion motor, as described above. The hybrid vehicle may be a series type in which the motor-generator 2 is linked to the engine 1. The hybrid vehicle may also be a split type in which the motor and the engine are linked to each other via a planetary gear or another differential arrangement, and the engine can be driven by the motor. The hybrid vehicle may also be a parallel type in which the engine and the motor are linked to each other via the clutch, and the engine can be driven by the motor. As described above, the arrangement is particularly suitable for a hybrid vehicle having a plug-in charge function, but can also be applied to a hybrid vehicle without a plug-in charge function. In this case, the need to lubricate the engine with oil is primarily created by long-term parking.

In the aforementioned embodiments, an example was described in which the oil reservoir is provided to the cylinder block, but the oil reservoir may be provided to another portion as long as there is a channel through which the oil falls.

Also as used herein to describe the above embodiment(s), the following directional terms "forward", "rearward", "above", "downward", "vertical", "horizontal", "below" and "transverse" as well as any other similar directional terms refer to those directions of a vehicle equipped with the engine structure on flat level ground. Accordingly, these terms, as utilized to describe the present invention should be interpreted relative to a vehicle equipped with the engine structure on flat level ground.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hybrid vehicle comprising:
   an engine comprising an engine structure including
   a cylinder block having an upper end for receiving a cylinder head, a lower end for receiving an oil pan, and a crankshaft receiving portion;
   a first oil circulation pathway and a second oil circulation pathway, each oil circulation pathway arranged to convey lubricating oil by gravity to at least an area located above the crankshaft receiving portion of the cylinder block for supplying lubricating oil to a crankshaft; and
   a lubricating oil reservoir disposed on a sidewall of the cylinder block adjacent the first and second oil circulation pathways, and being arranged to store lubricating oil, the lubricating oil reservoir having an open top end for receiving downwardly flowing lubricating oil, the open top end being disposed closer to the upper end of the cylinder block than to the crankshaft receiving portion of the cylinder block, the open top end of the lubricating oil reservoir being arranged relative to the first oil circulation pathway and the second oil circulation pathway such that lubricating oil only spills out of the open top end of the lubricating oil reservoir and falls into the first oil circulation pathway and the second oil circulation pathway as a result of vibrations by flowing over a first upper edge and a second upper edge of the open top end of the lubricating oil reservoir; and a propulsion motor arranged to propel the hybrid vehicle in an electric mode with the engine being stopped.

2. The engine structure according to claim 1, wherein
the lubricating oil reservoir is provided above a rotation central axis of the crankshaft receiving portion of the cylinder block.

3. The engine structure according to claim 1, wherein
the oil circulation pathway is integrally formed with an upper block part of the cylinder block as a one-piece member.

4. The engine structure according to claim 1, wherein
the lubricating oil reservoir is integrally formed with an upper block part of the cylinder block as a one-piece member.

5. The hybrid vehicle according to claim 2, wherein
the oil circulation pathway is integrally formed with an upper block part of the cylinder block as a one-piece member.

6. The hybrid vehicle according to claim 2, wherein
the lubricating oil reservoir is integrally formed with an upper block part of the cylinder block as a one-piece member.

7. The hybrid vehicle according to claim 3, wherein
the lubricating oil reservoir is integrally formed with an upper block part of the cylinder block as a one-piece member.

* * * * *